(12) United States Patent
Dudukovic et al.

(10) Patent No.: US 12,269,091 B2
(45) Date of Patent: Apr. 8, 2025

(54) SYSTEM AND METHOD FOR MULTIMATERIAL POWDER BED PATTERNING FOR USE IN ADDITIVE MANUFACTURING

(71) Applicant: Lawrence Livermore National Security, LLC, Livermore, CA (US)

(72) Inventors: Nikola Dudukovic, Hayward, CA (US); Alexander Baker, Livermore, CA (US); Joshua R. Deotte, Livermore, CA (US); Eric B. Duoss, Danville, CA (US); Scott McCall, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 411 days.

(21) Appl. No.: 17/106,251

(22) Filed: Nov. 30, 2020

(65) Prior Publication Data
US 2022/0168814 A1    Jun. 2, 2022

(51) Int. Cl.
*B22F 10/38* (2021.01)
*B22F 10/28* (2021.01)
*B22F 10/85* (2021.01)
*B22F 12/30* (2021.01)
*B22F 12/53* (2021.01)
*B33Y 10/00* (2015.01)
*B33Y 30/00* (2015.01)
*B33Y 50/02* (2015.01)

(52) U.S. Cl.
CPC .............. *B22F 10/38* (2021.01); *B22F 10/28* (2021.01); *B22F 10/85* (2021.01); *B22F 12/30* (2021.01); *B22F 12/53* (2021.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

2015/0210010 A1    7/2015  Napadensky
2015/0298393 A1   10/2015  Suarez
(Continued)

FOREIGN PATENT DOCUMENTS

CN    105798299 A  *  7/2016
CN    205929486 U     2/2017
(Continued)

OTHER PUBLICATIONS

Machine Translation of WO-2020089548-A1 (Year: 2020).*
(Continued)

*Primary Examiner* — Ricardo D Morales
(74) *Attorney, Agent, or Firm* — HARNESS DICKEY & PIERCE PLC

(57) ABSTRACT

The present disclosure relates to an additive manufacturing system. The system incorporates a nozzle in communication with a quantity of feedstock material including granular metal powder particles. The nozzle is configured to deposit the granular metal powder particles on at least one of a build plate or a previously formed material layer, to form at least one layer of a part. The system also incorporates a magnetic field generator subsystem for producing a magnetic field configured to orient the granular metal powder particles in a desired orientation before fusing of the granular metal powder particles occurs.

18 Claims, 8 Drawing Sheets

(56) References Cited

U.S. PATENT DOCUMENTS

| | | | |
|---|---|---|---|
| 2016/0297104 A1* | 10/2016 | Guillemette | B33Y 30/00 |
| 2016/0307678 A1 | 10/2016 | Unosson et al. | |
| 2016/0368055 A1 | 12/2016 | Swaminathan et al. | |
| 2017/0087632 A1 | 3/2017 | Mark | |
| 2017/0216918 A1 | 8/2017 | Orme-Marmarelis | |
| 2017/0252820 A1 | 9/2017 | Myerberg et al. | |
| 2018/0015666 A1 | 1/2018 | Honda | |
| 2018/0290381 A1* | 10/2018 | Volkov | B29C 64/188 |
| 2020/0147874 A1 | 5/2020 | Dudukovic et al. | |

FOREIGN PATENT DOCUMENTS

| | | | |
|---|---|---|---|
| CN | 108556338 A | 9/2018 | |
| WO | WO-2016114964 A1 | 7/2016 | |
| WO | WO-2016149032 A1 | 9/2016 | |
| WO | WO-2017021957 A1 | 2/2017 | |
| WO | WO-2017081040 A1 | 5/2017 | |
| WO | WO-2017156415 A1 | 9/2017 | |
| WO | WO-2020089548 A1 * | 5/2020 | B22F 10/20 |

OTHER PUBLICATIONS

Machine Translation of CN-105798299-A (Year: 2016).*
Xiao, Bin, and Yuwen Zhang. "Laser sintering of metal powders on top of sintered layers under multiple-line laser scanning." Journal of Physics D: Applied Physics, vol. 40, No. 21, Oct. 19, 2007, pp. 6725-6734 (Year: 2007).*
International Search Report and Written Opinion regarding International Application No. PCT/US2021/056791, dated Mar. 4, 2022.

\* cited by examiner

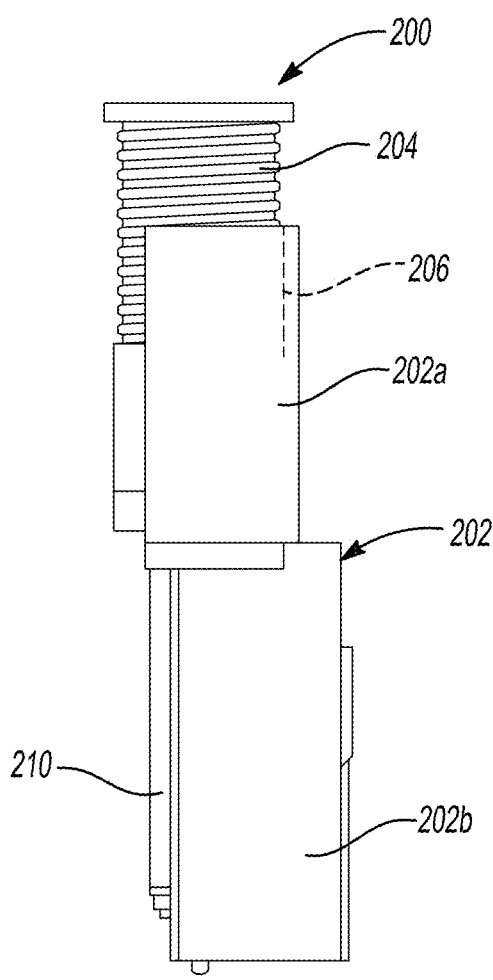
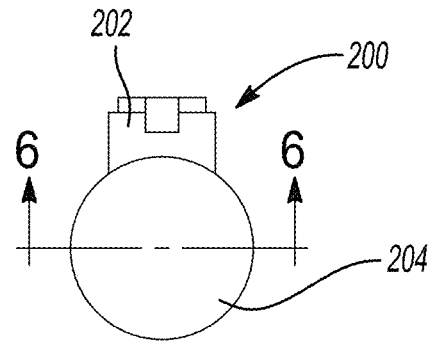
FIGURE 5
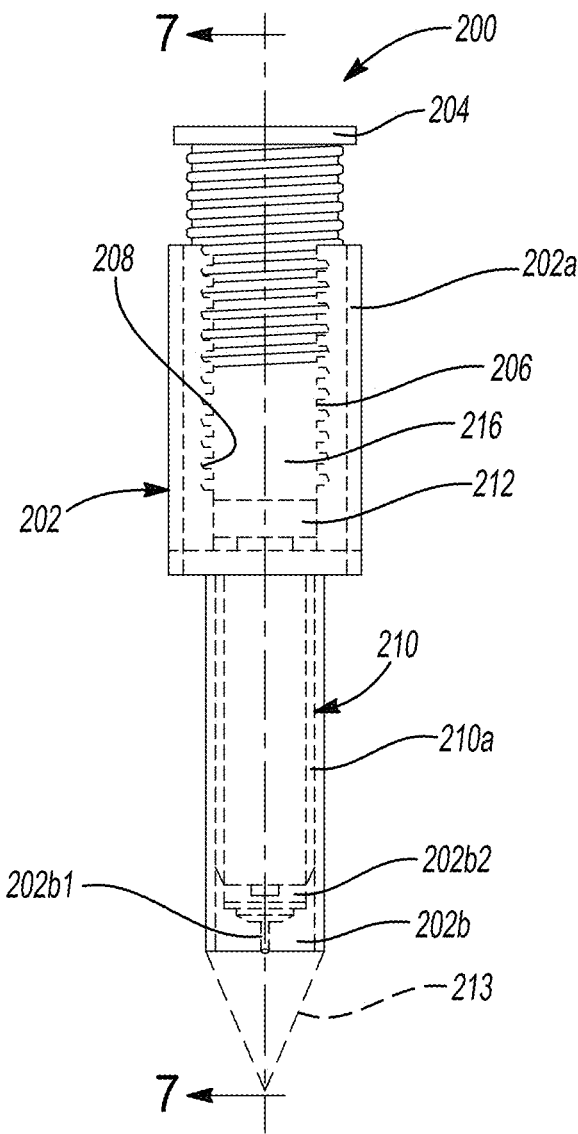
FIGURE 4
FIGURE 6

SYSTEM AND METHOD FOR MULTIMATERIAL POWDER BED PATTERNING FOR USE IN ADDITIVE MANUFACTURING

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for additive manufacturing, and more particularly to an additive manufacturing systems and methods which provide for highly controlled deposition of granular material feedstock when laying out a layer of the granular material feedstock, to thus control the orientations of granular particles prior to fusing the particles into a layer of the part.

BACKGROUND

This section provides background information related to the present disclosure which is not necessarily prior art.

Powder-based additive manufacturing (AM) processes have historically been limited to printing with a single material. In selective laser melting (SLM) or selective laser sintering (SLS), a layer of metal powder is spread across an entire build area, and solidified into a desired pattern using a laser beam that is rastered over the powder surface. The laser beam solidifies only select, desired portions of the metal powder, leaving other portions of the powdered material that are not acted on by the laser beam unaffected. This allows the unaffected powder portions of the layer to be removed thereafter. Binder jet printing involves spreading a powder layer and selectively applying a polymeric binder to desired portions of the powder layer using an inkjet-like process. The printed part is subsequently post-treated by removing the binder and sintering the metal.

In spite of the advancements made with the above described AM processes, limitations have remained with the ability to pattern the metal powder particles. This has limited the usefulness of AM in making various types of products, and particularly magnetic structures. In considering permanent magnets, the energy product, $|BH|<M2/4$, is a key metric for permanent magnets, providing a measure of the work that can be done with a given magnet. It is governed by two parameters, the remnant magnetization, MR, and coercive field, Hc. MR is a measure of the strength of the magnetization of a material, and it is generally highest in magnets that contain a large proportion of Fe. It is proportional to the volume of magnetic material, and thus the energy product of a permanent magnet goes as the square of its volume fraction. Hc is a measure of the resistance of a magnet to reorienting under opposing fields, demagnetization and thermal fluctuations, and thus must be maximized to ensure continued performance in demanding applications. It is governed by the microstructure of a magnet, necessitating great control over the manufacturing process. Magnet optimization often focuses on enhancing the coercivity through controlling grain size, orientation, and grain boundary phases. Since coercivity decreases with increasing temperature, large values are important in actuators, non-contact bearings and integrated power units.

High performance permanent magnets often include Nd2Fe14B, and SmCo5, the latter being preferred above 180 C due to its higher Curie temperature and formidable coercivity. These materials are brittle and prone to fracture, however, inflating production costs due to breakages and swarfs, which often exceed 25% of the starting material, and over 50% for small parts or prototypes. Consequently, only a limited range of shapes and designs is cost effective to produce with traditional AM manufacturing processes, even though design modifications such as reduced airgaps and improved flux concentration yield significant improvements in output power or efficiency.

Despite their promise, AM techniques have some drawbacks when used to make magnetic parts. Many approaches to powder metallurgy rely on directed energy, such as electron beam melting, laser blown powder disposition, laser sintering, or metal laser melting, which produce fully dense parts, but degrade the starting microstructure and the corresponding desirable magnetic properties. There is often a tradeoff between mechanical strength and magnetic performance with such techniques, limiting their adoption. In response to this shortcoming, there are several approaches that do not require material melting, such as binder jet printing. These approaches can be very effective for producing bonded magnets but they only produce a part having a magnetic material density of about 70%. This means that the energy product is only about 50% of a fully dense part. In light of these deficiencies, there has yet to be widespread adoption of AM by the permanent magnet industry.

However, neither of the above methods allow direct patterning of the desired features to be formed in each layer of a part using the powder material. The foregoing methods are limited to applying a powder material over the full area of a substrate or previously formed layer, and then using one or more post processing processes to permanently form the desired features of each layer, when making the part in a layer-by-layer process.

Further to the above, none of the above-described methods enable controllably orientating granular feedstock particles.

SUMMARY

This section provides a general summary of the disclosure, and is not a comprehensive disclosure of its full scope or all of its features.

In one aspect the present disclosure relates to an additive manufacturing system. The system may comprise a nozzle in communication with a quantity of feedstock material including granular metal powder particles. The nozzle is configured to deposit the granular metal powder particles on at least one of a build plate or a previously formed material layer, to form at least one layer of a part. The system may further include a magnetic field generator subsystem for producing a magnetic field configured to orient the granular metal powder particles in a desired orientation before fusing of the granular metal powder particles occurs.

In another aspect the present disclosure relates to an additive manufacturing system having a reservoir, a nozzle, a magnetic field generator subsystem and an electronic controller. The reservoir holds a quantity of feedstock material including granular metal powder particles. The nozzle communicates with the reservoir and receives the quantity of granular metal powder particles and deposits the granular metal powder particles on at least one of a build plate or a previously formed material layer, to form at least one layer of a part. The magnetic field generator subsystem operates to produce a magnetic field which orientates the granular metal powder particles in a desired orientation before fusing of the granular metal powder particles occurs. The electronic controller controls a flow of the granular metal powder particles to the nozzle.

In still another aspect the present disclosure relates to a method for additively manufacturing a metal part. The method may include positioning a nozzle over a build plate and then using the nozzle to deposit a quantity of feedstock material including granular metal powder particles, on at least one of the build plate or a previously formed material present on the build plate, to form at least one layer of a part. The method may further include generating a magnetic field in a vicinity of the build plate which acts on the granular metal powder particles to orient the granular metal powder particles in a desired orientation before fusing the granular metal powder particles occurs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings:

FIG. 4 is a perspective view of a print nozzle assembly in accordance with another embodiment of the present disclosure, wherein the print nozzle incorporates an internal rod which is able to be vibrated to help control dispensing of a powder feedstock material contained in a nozzle element;

FIG. 5 is a top plan view of the print nozzle assembly of FIG. 4;

FIG. 6 is side cross-sectional view of the print nozzle assembly of FIG. 5 taken in accordance with section line 6-6 in FIG. 5;

Figure 8:
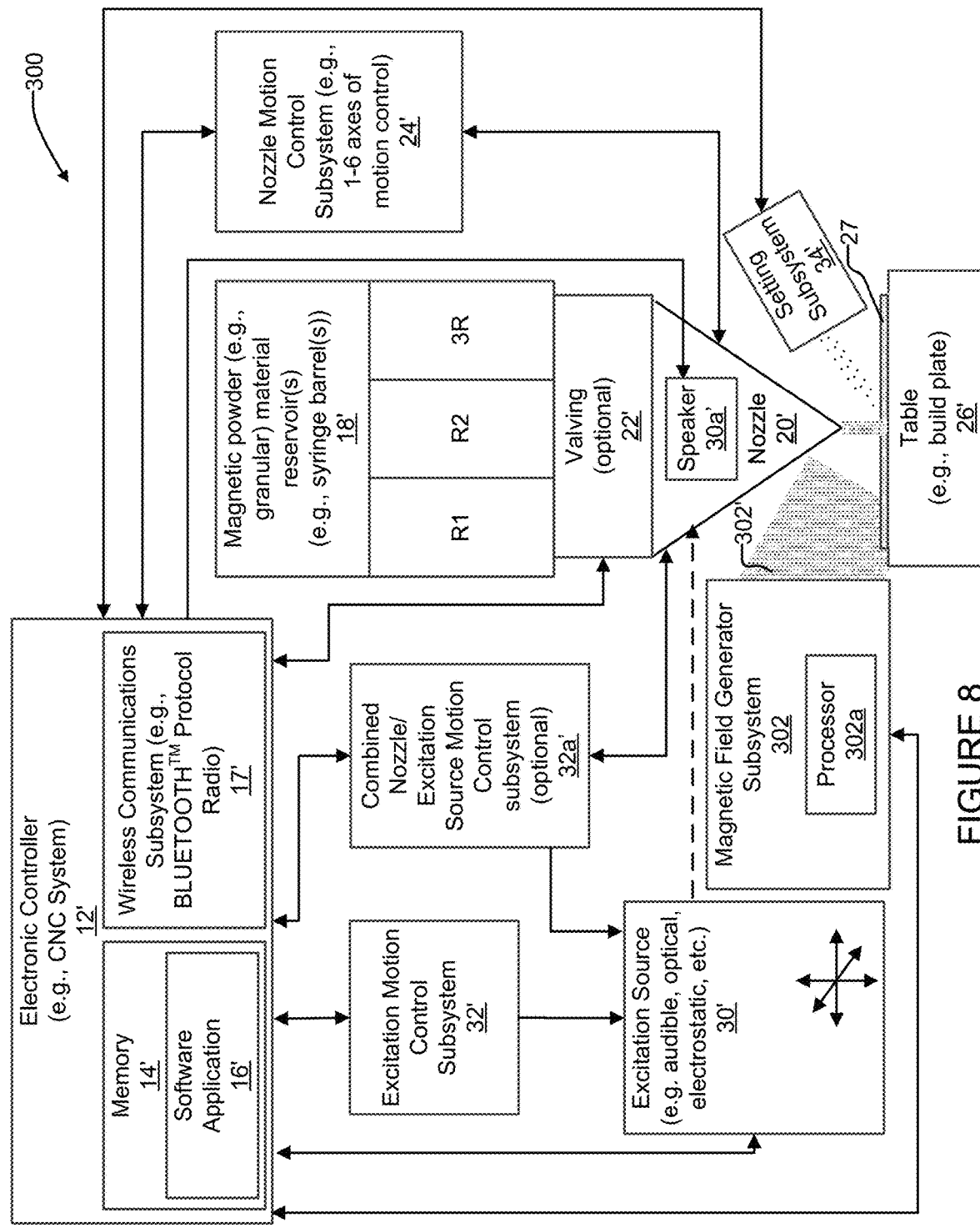
Figure 9:
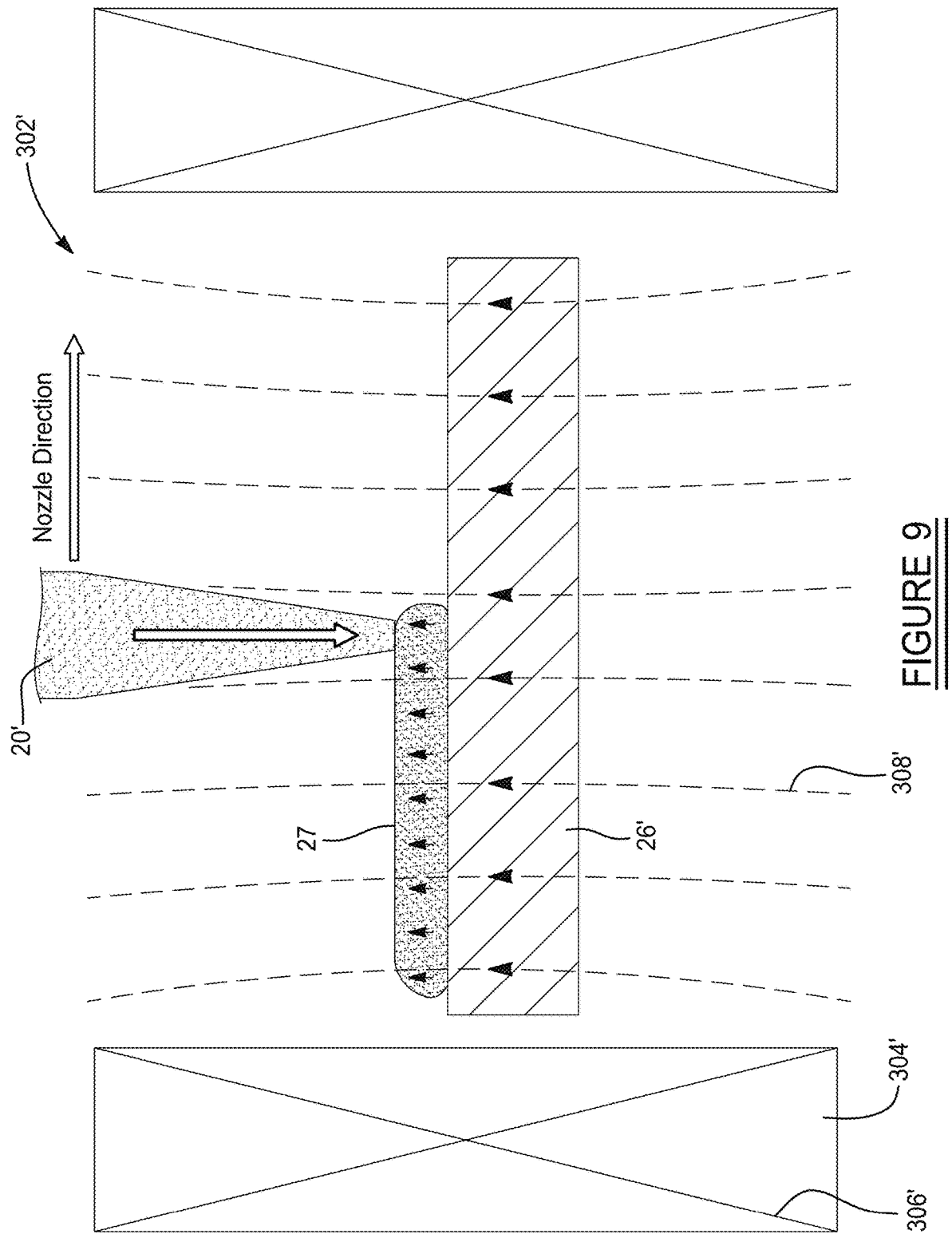
Figure 10:
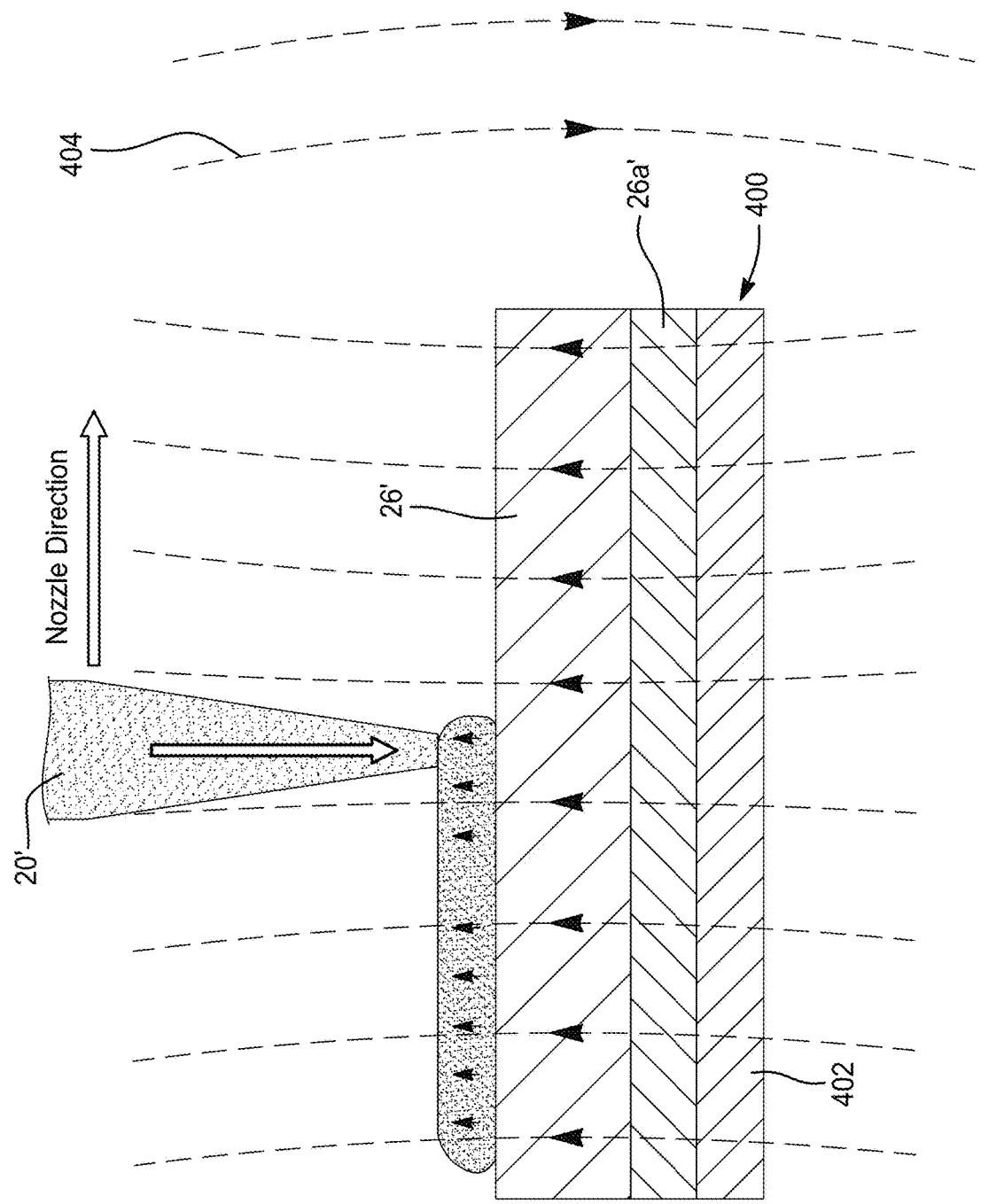

FIG. 8 is a high level block diagram of a system in accordance with another embodiment of the present disclosure which incorporates a magnetic field generator subsystem of applying a controlled magnetic field to metal powder particles which have been deposited on a build plate, or on a previously formed material layer, to orient the metal powder particles in a desired orientation before sintering occurs;

FIG. 9 is a high level side view diagram of one embodiment of the magnetic field generator subsystem used in the system of FIG. 8, arranged in proximity to the build plate, and where an electromagnet is used to produce the magnetic field, and where the magnetic lines of force are shown extending generally perpendicular to the upper surface of the build plate; and FIG. 10 is a high level side view of another embodiment of the magnetic field generator subsystem which employs a permanent magnet disposed underneath the build plate, and where the magnetic lines of force are shown directed perpendicular to the upper surface of the build plate.

Corresponding reference numerals indicate corresponding parts throughout the several views of the drawings.

DETAILED DESCRIPTION

Example embodiments will now be described more fully with reference to the accompanying drawings.

The present disclosure involves using a controlled granular flow to selectively deposit a powder material to be used in forming a 3D part or component, in areas of interest of each layer of the part, in a layer-by-layer operation. The powder material can be comprised of different material classes, for example and without limitation, metals, polymers, ceramics, etc. The powder material may also be comprised of different grades/types of a given material, mixtures of different types of powders, or even a single powder material but with different particle shapes, sizes, morphologies, etc. The present disclosure enables printing 3D components with multiple powders within a single layer, including support material that can eventually be removed. The patterned multi-material powder layer can then be treated with a binder and/or sintering aids or inhibitors and post-processed. Another possibility would be to first deposit a layer of liquid binder, then pattern the powder on top of it. Alternatively or additionally, an in-situ sintering process can be incorporated into the setup, using photonic sintering (e.g., intense pulsed light sintering), or microwave sintering of each powder layer, or treating each powder layer with a laser, electron beam or other directed energy source. This significantly reduces the time and equipment requirements necessary to produce a fully sintered three-dimensional metal component.

Figure 1:
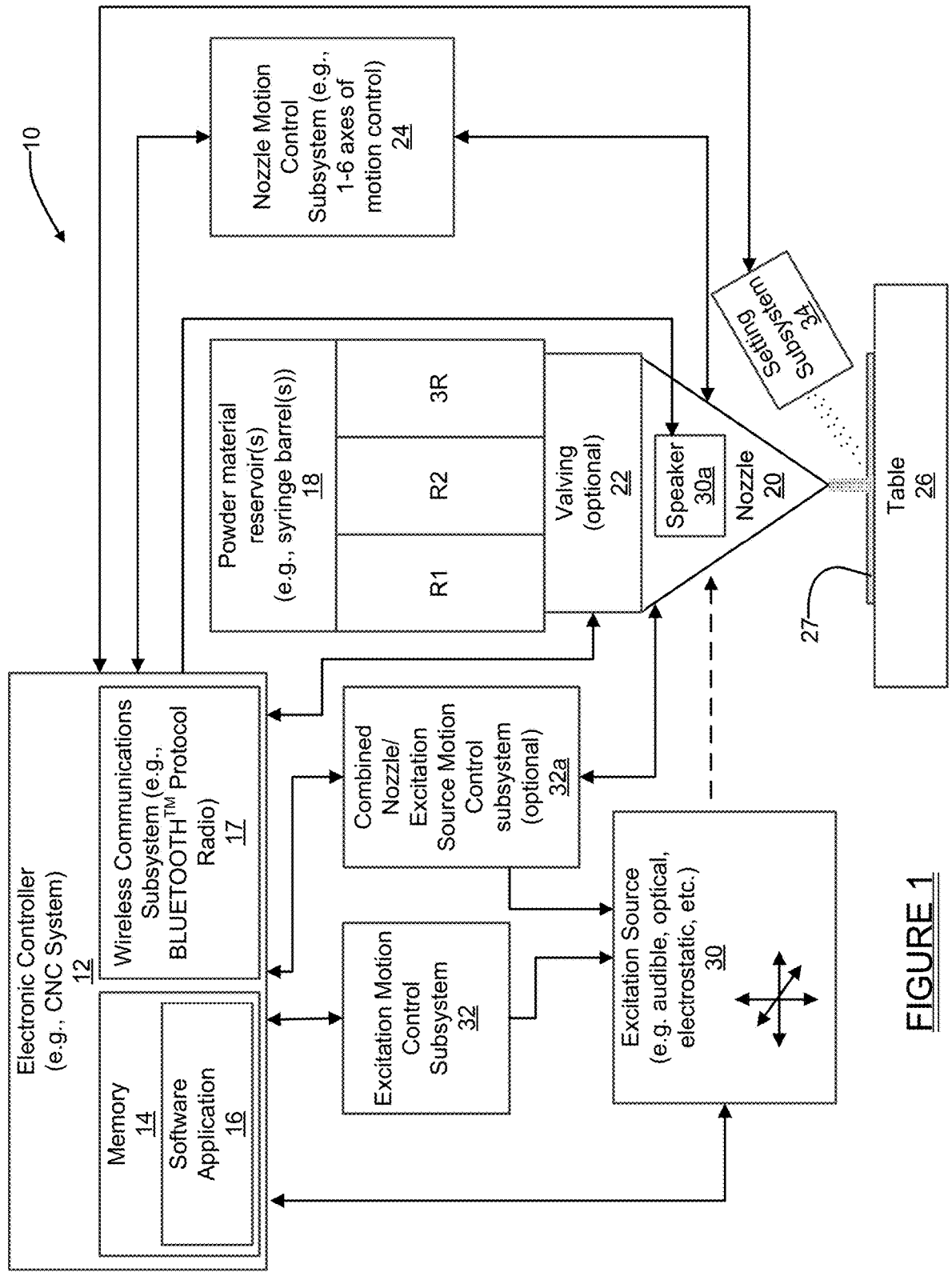
FIG. 1 is a high level block diagram showing one embodiment of a system in accordance with the present disclosure.

Referring to FIG. 1, a system 10 in accordance with one embodiment of the present disclosure is shown. The system 10 may include an electronic controller 12, for example a CNC system, having a memory (e.g., non-volatile memory such as RAM or ROM) 14 and a software program 16 used by the electronic controller 12 in controlling various other components of the system to form a 3D part. An optional wireless communication subsystem 17 may also be included as part of the electronic controller 12 or as a separate subsystem that is accessed by the electronic controller 12. In one embodiment the wireless communications subsystem 17 forms a BLUETOOTH™ protocol radio, although virtually any other wireless communications protocol may be used. The wireless communications subsystem 17 may be used to communicate wirelessly with one or more other components of the system 10, as will be described further in the following paragraphs.

The system 10 may further include a powder material reservoir 18, which may be syringe or any other suitable form of reservoir, and may optionally include two or more distinct reservoir portions for holding two or more different types of granular media. For convenience, the term "powder" will be used to denote the granular media. It will also be appreciated that the powder may be in randomly shaped particles, or it may be in the form of spherically shaped particles or any other shape, to best meet the needs of manufacturing a specific part. The system 10 is not limited to use with any shape of powder particles.

Reservoir portions R1-R3 are shown in FIG. 1, which may be used to hold different types (and/or different mixtures) of powdered material feedstock to be used in forming each layer of a 3D, multi-layer part. However, as noted above, the system 10 may be used with only a single type of powder, or possibly with more than three distinct types of powder, or even a single type of powder but in different shapes, sizes and/or morphologies. As such, the system 10 is not limited to use with any specific number of powders or any specific mixture of powdered material feedstock.

It will also be appreciated that while the use of multiple reservoirs is disclosed above, the present disclosure is not limited to using just one material (or mixture of materials) per layer of the part being formed. For example, with the system 10, one may choose to adjust mixtures from different reservoirs R1-R3 within one layer, for example to form functionally graded parts. Also two or more of the reservoirs R1-R3 could be filled with the same material (or material mixture) so that one reservoir could be dismounted and refilled while another is being used, to accommodate long print jobs without stopping the system 10 from printing. This may be important if the reservoirs 18 travel with a print head (e.g., on a system like an inkjet system) and the overall travelling weight of the print head needs to be minimized, or if the material mixture has a short shelf life in its un-cured state, and must be produced in some small batch process.

By changing the above described conditions, the flow rate, feature size, shape, continuity and other factors can be highly tuned and controlled. The choice of particle size depends upon the desired nozzle size and, hence, feature size. In most cases, particle sizes on the order of 1 micrometer to 1 mm in diameter are selected though particle sizes can fall outside this range. The choice of particle shape is also important. In most cases, spherical particles are ideal, though not necessary. Other attributes that affect printability include powder surface morphology, surface area, surface charge, density, etc.

With further reference to FIG. 1, the system 10 may also include a nozzle 20 into which a granular material feedstock is fed from the reservoirs R1-R3. The granular material feedstock may be in the form of a powdered material feedstock, and for convenience the feedstock will be referred to throughout as simply "powdered material feedstock". The nozzle 20 may have an opening of any suitable dimension, but it is expected that in many cases the nozzle will have a flow opening which is typically between about 100 um to 1 mm in diameter. The nozzle 20 essentially forms a print head which can be comprised of a wide array of feedstock materials including plastics, metals, and ceramics. Tapered, conical nozzles may be preferable, although are not absolutely necessary. Assuming that a plurality of powder reservoirs are used, then it may be helpful to include a valving system 22, controlled for example by the electronic controller 12, to control the application and/or mixing of two or more different types of powders. The powdered material feedstocks may be metallic powders, plastic powders, ceramic powders, etc., and the system 10 is not necessarily limited to use with any specific type of powdered or granular material feedstock. It will also be appreciated that some of the materials being deposited, in addition to dry granular media (e.g., powders), could be liquids (e.g., binders) or could be or WET granular media (e.g., pastes or slurries) in addition to the powders. This "hybrid" approach is believed to be unique in that one may selectively deposit different combinations of powders, liquids, binders, slurries, pastes, etc. in a single printing process. Different layers of a single part could even be made of differing combinations of the above materials.

A nozzle motion control subsystem 24 may be controlled by the electronic controller 12 and used to control movement of the nozzle 20 in one, two or more axes, or for example about X, Y and Z axes, and even more preferably about three to six different axes of motion, relative to a table 26 on which each layer 27 of the 3D part is being formed. Five or six different axes of motion control is common with present day Direct Ink Write 3D printing systems. In another implementation, shown in FIG. 2, the table 26 may be controlled for movement in the desired number of axes (e.g., anywhere from two to six) using a table motion control subsystem 28 instead of moving the nozzle 20. Optionally, both nozzle 20 movement and table 26 movement could be implemented, although in practice it is expected that, in most implementations, one of these two components will be held stationary while the other is moved as needed to form each layer of the 3D part.

The system 10 described herein could also be used to deliver particles "just in time" to be sintered, for example on a non-planar substrate, thus removing the powder bed entirely. Rotations might also be useful to allow powder delivery and directed energy access substantially simultaneously. Also, it will be appreciated that the axes of movement need not be perpendicular so long as they are not parallel; that is, for example, one could have a perfectly well behaved XY system with axes at 0 and 60 degrees, which will cover the plane despite not having perpendicular axes. Still further, another possible positioning mechanism for the system 10 may involve the use of a hexapod-like mounting where the position and rotation of the part or powder bed is controlled by linear actuators that are not perpendicular to each other. Thus, the system 10 is not limited to use with a two or three axis positioning mechanism, but may incorporate any of the aforementioned positioning systems and/or controls, which provide anywhere from two to six, or possibly even more than six, degrees of motion.

The system 10 further includes an excitation source 30 which may be used to generate an excitation signal that induces a flow of the powdered material from the nozzle 20 as needed to form the required features of a given layer of the 3D part being. The flow may be achieved by inducing a slight oscillatory motion in the nozzle 20 using the excitation signal, or possibly even by inducing an oscillatory motion of the powdered material feedstock within the nozzle by using the excitation signal but without any tangible vibration of the nozzle itself. The flow may also be achieved by a mechanical screw-driven flow or via a different delivery method that allows ready start/stop operation. In most instances, it is expected that inducing a slight oscillatory motion or vibration of the nozzle 20 will be preferred. Optionally, the excitation source 30 may be controlled using wireless signals from the wireless communications subsystem 17.

The excitation source 30 may be moved in a controlled fashion by an excitation motion control subsystem 32 that moves the excitation source 30 in two or more axes as needed to control the release of the powdered material feedstock from the nozzle 20. Optionally, the movement of both the nozzle 20 and the excitation source 30 may be controlled by a combined nozzle/excitation source motion control subsystem 32a, or the excitation source 30 may be slaved to movement of the nozzle 20. Whether separate motion control subsystems 24 and 32 are used, or a single motion control subsystem is used to move both the nozzle 20 and the excitation source 30, may depend on the degree of motion/movement control required for the excitation source 30, as well as other factors. As another option, a mechanical connection between the excitation source 30 and the nozzle 20 may be used so that the nozzle could be oscillated mechanically in a controlled way to control the release of material.

In one implementation the excitation signal emitted from the excitation source 30 may be an acoustic signal emitted from a transducer such as a tunable speaker positioned in reasonable proximity to the nozzle 20 (e.g., within 1-15 mm). If an acoustic signal is used as the excitation signal, then one or more of the frequency, the amplitude or the direction of propagation of the acoustic signal may be controlled to induce a controlled vibration or oscillation of the nozzle 20, which in turn causes a carefully controlled release of the powdered material feedstock from the nozzle 20. The controlled release may also simultaneously accomplish a mixing of two or more distinct types of powdered material feedstock. The excitation signal may also be an optical signal provided by an optical signal source, for example a laser, or an electrostatic signal, or even a thermal signal, which induces a slight vibration or oscillation of the nozzle 20. Each of these forms of excitation signals may be controlled in amplitude, and/or frequency and/or directional pointing of the excitation source 30, as well as through using simple On/Off control, to induce a highly controlled flow (or combined flow and mixing) of powdered material feedstock from the nozzle 20. Material flow may also be monitored, for example, by using acoustic transduction. This may enable one to identify an optimal resonance frequency.

Alternatively, a miniature speaker 30a (e.g., a piezoelectric speaker) may be placed inside the nozzle 20 and supplied with an electrical signal either from the electronic controller 12, or from the excitation source 30, or possibly wirelessly using the wireless communications subsystem 17. The electrical signal may be controllably varied in amplitude and/or frequency. In either instance, the speaker 30a, when energized, helps to cause a highly controlled release of the granular material feedstock from one or more of the reservoirs R1-R3.

Still another excitation source may involve a source similar to a cell phone "silent ringer" caused by controlled rotation of an eccentric mass. This rotation may be of controllable frequency, and may be made controllable in amplitude and direction of propagation if the eccentric mass or rotation of axis can be changed. Accordingly, it will be appreciated that the excitation source 30 is not limited to any one specific excitation method.

In the absence of the excitation signal, the powdered material feedstock in the nozzle 20 does not flow out from the nozzle. In this manner, the excitation signal can be used to control both the On/Off flow of powdered material feedstock onto the table 26 (or onto a previous material layer formed on the table 26), or even the quantity of powdered material feedstock (i.e., rate of flow of material per unit of time) that is released by the nozzle 20. Controlling both the On/Off flow, as well as the quantity of powdered material feedstock, enables the features of a given layer to be precisely patterned using the powdered material feedstock, rather than the powdered material feedstock simply being used to cover an entire area of a given layer of the 3D part. This highly precise "patterning" of powdered material feedstock to form each layer of a 3D part can also help to reduce the amount of powdered material that is wasted (i.e., not used) when forming each layer of the 3D part.

Referring further to FIG. 1, a setting subsystem 34 may be controlled by the electronic controller 12. The setting subsystem 34 may be used to perform a post-processing operation on the just-laid down powder material layer. The post-processing operation may be to apply a binder (e.g., polyvinylpyrrolidone, polyvinyl alcohol), using the setting subsystem 34, to the just-laid down powder layer before proceeding with deposition of a new powder layer. Alternatively, the post-processing operation may be to use the setting subsystem 34 to perform an in-situ sintering process using an optical signal, for example an optical signal from a laser or even electromagnetic energy (e.g., microwave energy) from a suitable energy source (e.g., flash lamp), which is controlled in amplitude, frequency, directional pointing, or through a combination of all of these factors. Still further, the setting subsystem 34 could be used to perform a setting operation substantially simultaneously with application of a binder. For example, the system 10 may be used with a heat-activated binder such as solder, or possibly even with a UV-curing adhesive. Accordingly, the present disclosure is not limited to any particular form of "setting" operation or technique, or to just performing a "post-processing" setting operation. The type of powdered material(s) used may be an important factor in the actual setting technique/operation that is performed by the setting subsystem 34. It is also possible that the setting subsystem 34 may perform applying a binder along with a sintering operation immediately after, or shortly after, the binder is applied.

The setting subsystem 34 may be controlled to "track" motion of the nozzle 20 or even motion of the table 26, if the table is being moved instead of the nozzle. This may be accomplished by "slaving" the setting subsystem 34 to movement of the nozzle 20, such as by using signals from the nozzle motion control subsystem 24, or possibly by using the setting subsystem 34 to "set" (e.g., sinter) an entire layer at once while it is held stationary.

Figure 2:
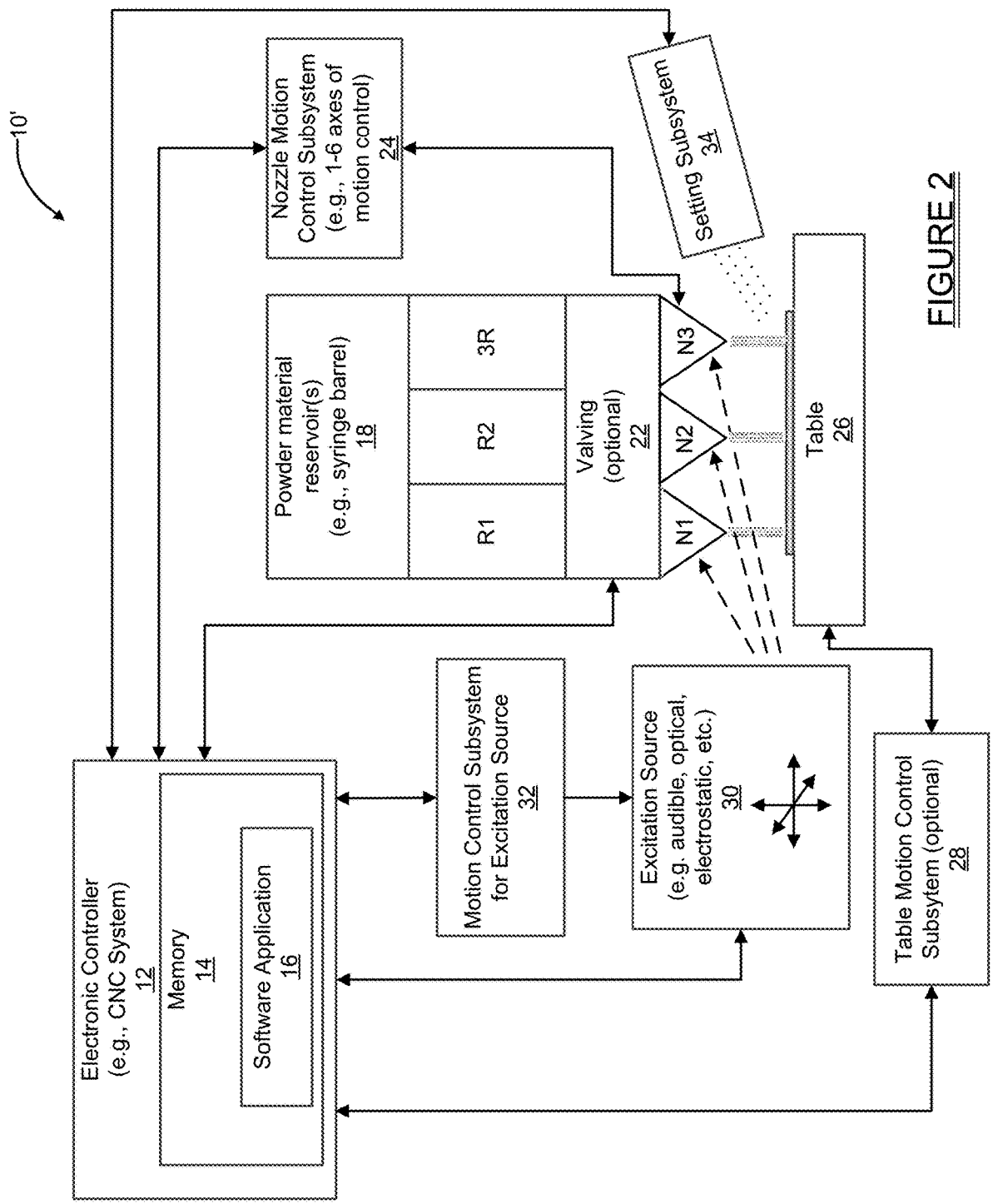
FIG. 2 is a high level block diagram showing another embodiment of a system in accordance with the present disclosure which makes use of a plurality of independently controllable nozzles, as well as a movable table.

Referring briefly to FIG. 2, another embodiment 10' of the system shown in FIG. 1 is illustrated. The system 10' is identical to the system 10 with the exception that independent nozzles N1, N2 and N3 are used. Reference numbers in common with those used in FIG. 1 are used to designate common components in the system 10' shown in FIG. 2.

Figure 3:
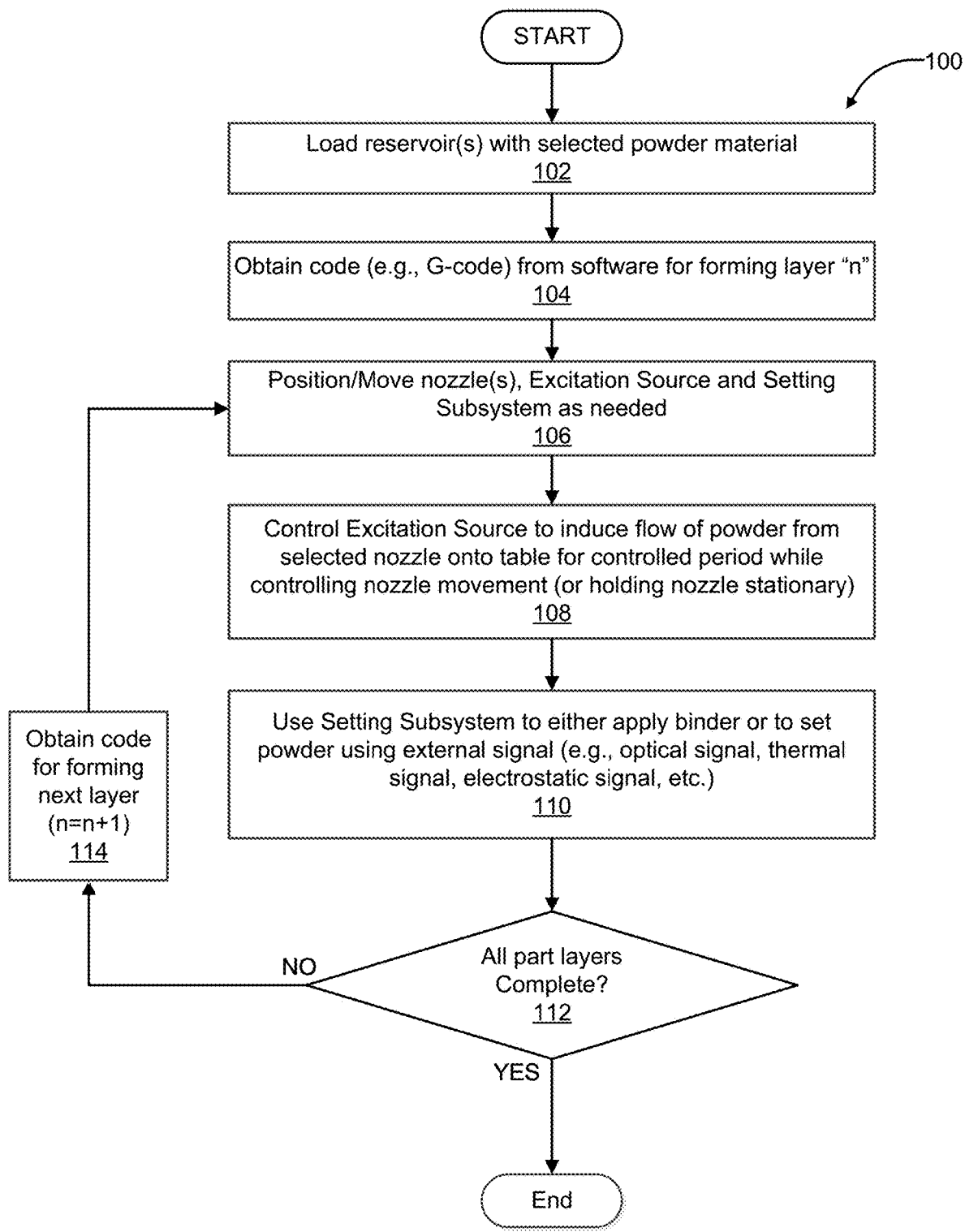
FIG. 3 is a high level flowchart illustrating operations that may be performed by the various embodiments of the present disclosure in forming a complete 3D part.

Another important advantage of the systems 10 and 10' is being able to control the printed feature size "on the fly". For example, one may picture a line of powder being deposited onto a surface while printing a layer of a part. At constant amplitude/frequency of the oscillating signal, the printed line will have a constant width. But when the oscillation amplitude and/or frequency are changed during the movement of the nozzle/surface, the printed line will change in width (and/or possibly in thickness as well). This change happens almost instantaneously. Accordingly, this provides the system 10 with the ability to change the printed feature size, in real time, in a continuous or discrete manner during the deposition which, in the understanding of the co-inventors, is a feature that no other present day AM technique offers Referring to FIG. 3, a flowchart 100 is shown setting forth various operations that may be performed by the system 10 (or system 10') in forming a complete 3D part. Initially one or more of the powder feedstock material reservoirs R1/R2/R3 may be loaded with dry powdered material feedstock, as indicated at operation 102. The reservoirs R1/R2/R3 may be formed by a cartridge, such as a syringe barrel, to which the nozzle 20 is affixed. We then add an excitation source that induces flow of the dry powder (also known as granular media).

At operation 104 the code (e.g., G-code) needed for forming a specific layer of the 3D part may be obtained by the electronic controller 12. At operation 106 the nozzle 20

(and/or table 26) may be positioned at a start point to begin forming a particular layer of the part, as indicated at operation 106. At operation 108, the excitation source 30 is controlled by the excitation motion control subsystem 32, and the nozzle 20 is controlled by the nozzle motion control subsystem 24, to cause deposition of the powdered material feedstock onto the table 26 for forming an initial layer of the part. As noted above, however, a single motion control subsystem 32a may be used to control motion of both of the nozzle and the excitation source 30. In either implementation, the powdered material feedstock is deposited in a highly controlled fashion as needed to form the features of the initial layer of the part.

At operation 110 the setting subsystem 34 may be controlled to either apply a binder to the just-deposited powdered material feedstock, or to set the powdered material feedstock using a suitable signal (e.g., optical signal, thermal signal, electrostatic signal, etc.). At operation 112 a check is made by the electronic controller 12 if all layers of the part are complete. If this check produces a "No" answer, then the code needed to form the next layer of the part is obtained, as indicated at operation 114, and operations 106-112 may be repeated. If the check at operation 112 indicates that all layers of the part are complete, then the part forming operation is complete.

Referring to FIGS. 4-7, a print nozzle assembly 200 in accordance with another embodiment of the present disclosure is shown. It will be appreciated that the print nozzle assembly 200 may simply be substituted in place of the nozzle 20, and may be used with all of the variations of the system 10 (e.g., amplitude and/or frequency control of excitation signal)described in connection with the system 10 and the nozzle 20. With specific reference to FIGS. 4-6, the print nozzle assembly 200 in this example includes a housing/printer connection 202 having an upper housing portion 202a and a lower housing portion 202b. The upper housing portion 202a may be supported from any suitable structure associated with the nozzle motion control subsystem 24 so that the nozzle assembly 200 may be moved over the table 26 (FIG. 1).

Figure 7:
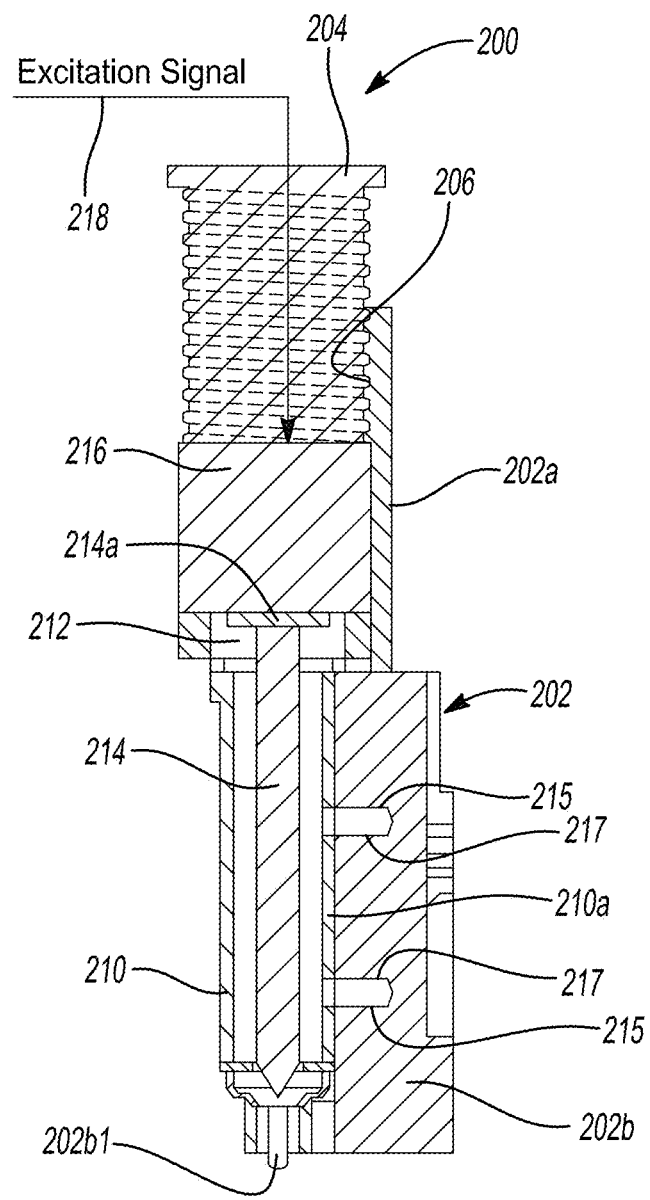
FIG. 7 is a side cross-sectional view of the print nozzle assembly of FIG. 6 taken in accordance with section line 7-7 in FIG. 6.

With reference to FIGS. 6 and 7, the upper portion 202a includes a threaded fastener/cap 204 which is at least partially seated in a threaded bore 206 in the upper portion. With reference to FIGS. 6 and 7, the threaded bore 206 helps to define an internal chamber 208 in which a syringe 210 is placed. The syringe 210 is used for holding the powdered (e.g., granular) material feedstock that is deposited on a work surface when creating a part in a layer-by-layer 3D printing operation. A sealing ring 212 is disposed at an upper end of the syringe 210. The syringe 210 communicates with a discharge port 202b1 formed in the lower housing portion 202b. The powdered material feedstock is discharged from the discharge port 202b1 and flows into a nozzle element 213 (shown in phantom in simplified diagrammatic form) onto a work surface. In one embodiment the nozzle element 213 is a conical-like component, although it need not be conically shaped, and may be attached by a threaded portion to an outer threaded surface 202b2 of the syringe 210, or attached by any other suitable means.

FIG. 7 shows another cross-sectional view of the print nozzle assembly 200 in accordance with section line 7-7 in FIG. 6. In this view it can be seen that the syringe 210 has positioned inside of it an element 214 for producing vibration. In this example the element 214 is an elongated rod, and will be referred to throughout the following description as the "elongated rod 214" merely for convenience. However, it will be appreciated that other shapes of elements besides an elongated rod-like shape may be used, and the exact shape of the element may depend in part on the shape of the syringe 210 and/or other factors.

An upper end of the elongated rod 214 includes an enlarged planar portion 214a and is positioned closely adjacent, or may actually be touching, a transducer 216. The enlarged planar portion 214a may rest on the sealing ring 212 or may be encapsulated within the sealing ring 212 as shown in FIG. 7. Post-like elements 215 project laterally from an outer housing 210a of the syringe 210 and fit into recesses 217 to help support the syringe 210 from the lower housing 202b. In one embodiment the transducer 216 may be a speaker element (hereinafter referred to as "speaker element 216" for convenience), and may be encased in a portion of the sealing ring 212. The sealing ring 212 may be a plastic spacer or any other suitable spacer to accommodate and position the speaker element 216 relative to the syringe 210. The sealing ring 212 could also be formed by an O-ring seal.

When the print nozzle assembly 200 is assembled, the elongated rod 214 will be projecting into the powdered material feedstock present in the syringe 210 and thus be in contact with the powdered material feedstock. The speaker element 216 may be fed with an electrical signal via signal line 218, or alternatively may be a speaker having wireless communication capability, such as a BLUETOOTH™ protocol enabled speaker, which is controlled using the wireless communications subsystem 17 (FIG. 1). In one embodiment the speaker element 216 may have an internal rechargeable battery, or optionally it may be powered remotely via power delivered by electrical conductors. In one embodiment the speaker element 216 comprises a piezoelectric speaker or a ribbon type speaker, although other forms of speakers may be used. Another type of speaker which may be used is a vibration or contact speaker. A vibration or contact speaker contains a movable plate connected to the electromagnetic "voice" coil. This plate makes contact with the target surface to transmit the vibrational energy. This differs from a typical piezoelectric speaker, which typically includes a diaphragm that deforms when a voltage is applied. It will also be appreciated that other forms of transducers may be used to impart energy to the rod 214. For example, the rod 214 could be coupled directly to a voice coil of a transducer. Accordingly, the nozzle assembly 200 is not limited to use with only an internally mounted speaker element for providing the energy to vibrate the rod 214. And also, the speaker 216 in this embodiment operates as the excitation source 30 of FIG. 1.

In operation, a suitable electrical signal fed to the speaker element 216 causes an acoustic signal to be imparted to the elongated rod 214. This causes a highly controlled vibration of the elongated rod 214 which in turn causes a highly controlled vibratory signal to be applied to the powdered material feedstock contained in the syringe 210. The vibratory motion imparted to the powdered material feedstock causes a highly controlled deposition of the feedstock through the discharge portion 202b1 onto the work surface (not shown). Typically, the discharge port 202b1 will be positioned typically within about 0.1 mm-0.5 mm of the work surface.

The system 10 and method described herein offers precise control over the stop and start behavior of the powdered material feedstock deposition. In the case of a speaker system excitation, as noted above, the flow conditions are affected by the frequency, amplitude and direction of the audio signal (e.g., vibration), among other things. Multi-material printing can occur by harnessing multiple nozzles 20, implementation of active mixing of powders at various ratios, or by design of sophisticated print heads that mimic inkjet printing systems. Incorporation of valving systems into the nozzle/print-head is also possible. This process can be used to pattern 1D, 2D, and 3D parts.

The present system 10 and above-described method, in its various embodiments, may thus be used to rapidly print 3D objects having layers that have complex features. The system 10 can be incorporated into existing additive manufacturing platforms, especially those that depend upon powder bed processes. For example, the powder printing process can be deployed in addition to powder spreading, wiping, or other deposition processes for creating of layers of powders for powder bed-based AM processes. A setup containing a multiple-inlet, active mixing body (i.e., nozzle) can be used to generate a mixed powder output at varying relative concentrations of the components, thus enabling the printing of structures with material concentration gradients that may differ throughout the structure. In one embodiment, gravity is used to assist with pulling the powders out of the nozzle 20, although the use of gravity is not essential. The powdered material feedstock may be slightly pressurized within the powdered material feedstock reservoir to assist with printing into directions that are not aligned with the force of gravity. For example, the embodiments of the system 10 described herein may be used to print onto surfaces that are coated with adhesive. In subsequent steps, the patterned powder may be further processes. For example, a laser, laser diode with optically addressable light valve, or electron beam could be used to heat treat, sinter, densify, and/or anneal the powder. In another example, an inkjet print head could be used to bind the powder to create a patterned green body. Optionally, the entire powder bed could be treated with thermal post-processing steps, among others.

While the embodiments of the systems 10 and 10' enable a highly controlled deposition of granular feedstock materials, they do not provide the ability to position granular metal powder particles deposited on a layer or substrate in a desired orientation, prior to fusing the powder. A system 300 in accordance with another embodiment of the present disclosure, as shown in FIG. 8, provides this capability. The system 300 shown in FIG. 8 enables the orienting of metal particles during deposition, or immediately after being deposited on a substrate or previously formed layer, but before being fused. It will be appreciated that while the system 300 is shown incorporating the elements of the system 10 shown in FIG. 1, and thus also takes advantage of the ability to control the deposition of the granular powder particles in a highly controlled way from a nozzle, this portion of the system 10 is not needed for the controlled orienting of magnetic granular particles, as will be described more fully in the following paragraphs. In FIG. 8, components in common with those shown in the FIG. 1 have been labelled with the same reference number together with a prime ("'") designation.

In one embodiment the system 300 operates by flowing a quantity of granular metal powder particles from at least one (but potentially more than one) of the reservoirs R1-R1 through a nozzle 20'. A deposition rate and pattern of the metal powder particles may be controlled using the excitation source 30', as described herein with respect to the system 10. The metal particle size is typically (but not limited to) microns or tens of microns in diameter, and can be mono- or polydisperse. The nozzle 20' may be operatively coupled to or supported from a 3D positioning subsystem 32' that enables the nozzle 20' to be moved in each of X, Y and Z axes as needed so that complicated 2D shapes or patterns can be laid out across the table 26' (e.g., build plate). Three dimensional shapes can be built up through sequential deposition and fusing of a plurality of layers of the material, one after another. The feature size and particle packing are controlled in part by the nozzle 20' geometry, by amplitude, by a frequency of the power supplied by the excitation source 30', by the position and speed of movement the nozzle 20' relative to the build plate 26', by a degree of cohesion of the powders, and by combinations of the just-listed factors.

When applied to magnetic powders, the system 300 enables near-net shape fabrication of high performance permanent magnets including, but not limited to, Nd2Fe14B and SmCo5, low cost permanent magnets such as ferrites, soft magnets such as FeSi, Ni75Fe20Mo5 or amorphous metals (e.g., METGLAS® amorphous metal), and other magnetic materials including multiferroics and nanocomposites.

It will be that many magnetic materials are extremely brittle, thus limiting the range of shapes it is economically feasible to manufacture. The system 300, with its ability to provide near-net shape fabrication, overcomes this limitation. The system 300 thus enables fabrication of complex shapes including, but not limited to, tight arcs, conics, acircular structures, or fine features on the sub-millimeter scale.

Once the powders are deposited using the nozzle 20' they must be sintered to achieve good mechanical strength and increase filling factor (which is essential for good magnetic properties). The process may include an intermediate step of applying a polymeric binder to the particles, which can subsequently be removed by thermal treatment. The sintering can be done ex-situ in a furnace with a controlled atmosphere or in-situ using photonic sintering approaches. Further, the multi-material capabilities of the system 300 can be leveraged to fabricate compositionally graded magnets, by changing the powder feed, using multiple nozzles 20', or by mixing powders from two or more of the reservoirs R1-R3, in situ, at desired ratios.

As one specific manufacturing example, when fabricating a device such as a motor using the system 300, the magnet housing can be deposited at the same time as the magnet powder, then sintered together to make a single consolidated part. Yokes and similar devices, such as microwave circulators, can be made in the same way using the system 300. This manufacturing capability to make two or more distinct components of a part together, in a single manufacturing operation, greatly simplifies the manufacturing process, removes the need for adhesives or mechanical attachments, and enables miniaturization that would not be possible using other manufacturing approaches.

For enabling controlled orienting of the metal powder particles, the system 300 may incorporate a magnetic field generator subsystem 302 for generating a controlled magnetic field 302'. The magnetic powder particles can be aligned (i.e., oriented in one or more desired orientations using the magnetic field 302' created by the magnetic field generator subsystem 302, either during or after deposition, by applying the one or more magnetic fields to the build plate 26'. The magnetic field generator subsystem 302 may be controlled using a dedicated processor 302a, or by the electronic controller 12'. The magnetic field generator subsystem 302 generates the magnetic field 302' (e.g., a uniform magnetic field) which creates a torque which acts on the metal powder particles to rotate and align them with the external field direction. This imposes a preferred orientation of magnetization in the final part, which can be highly desirable in achieving optimal magnetic performance of the part. More specifically, a gradient in the magnetic field 302' exerts a force on the metal powder particles which operates to pull them in specific directions. This operation may also be helpful in increasing the maximum build height of a layer of magnetic particle particles before sintering the layer.

FIG. 9 shows an embodiment of a magnetic field generator subsystem 302' which incorporates an electromagnet 304' having a solenoid coil 306', with the solenoid coil 306' being arranged around the build plate 26'. The electromagnet 304' generates magnetic lines of force 308' which are generally perpendicular to an upper surface of the build plate 26'. The magnetic lines of force 308' will orient the granular powder particles that form layer 27 such that the poles of the particles are arranged along these field lines, or put differently, parallel to the magnetic lines of force. The electromagnet may be controlled in its ON/OFF operation by a dedicated controller (not shown) or by the electronic controller 12'. In some applications, the driving signal (e.g., voltage and/or current) to the electromagnet may be varied so as to vary the field intensity over a range of intensity values as a layer is being fused or sintered.

FIG. 10 shows another embodiment of a magnetic field generator 400 in accordance with the present disclosure. In this example the magnetic field generator is formed by a permanent magnet 402 which is disposed underneath the build plate, and which generates magnetic lines of force 404 which extend generally perpendicularly through the build plate. In one embodiment the permanent magnet 402 is fixedly secured to a lower surface 26a' of the build plate 26' such as by threaded fasteners, or by adhesives, or by other mechanical means. In another embodiment the permanent magnet 402 is simply positioned under the build plate 26' but not physically attached thereto.

In various embodiments, the magnetic field generator subsystem 302 could comprise two or more permanent magnets or two or more electromagnets that impart slightly differing magnetic fields which serve to orient the magnetic powder particles along two or more distinct axes. Still further, a position/orientation control movement control system (e.g., stepper motors controlled via an electronic control system) could be used to controllably alter the orientation and/or position/location of the magnetic field generator subsystem. If these components are incorporated into the system 300, this would enable the system 300 to orient two or more subportions of the metal powder particles in each layer along two or more different axes. Further control over the orientation of metal powder particles could be created by using differently shaped powder particles. Still further, two or more different permanent magnets (or two or more electromagnets) arranged in strategic locations around the build plate 26' could be used to orient to or more differently shaped or differently dimensioned granular metal particles.

By varying the magnetic field during deposition it is possible to create a final structure with a spatially varying magnetic field. This is useful in the creation of, for example, Halbach arrays. Halbach arrays employ alternating alignment of magnetization to generate strong spatially uniform fields for applications in, for example, steering particle beams or in advanced generator topologies. The system 300 is especially advantageous because traditional Halbach arrays require separate assembly operations to attach individual blocks of permanent magnets together in an alternating or rotating pattern. The system 300 enables the entire array to be formed in a single manufacturing process, which not only increases the mechanical strength of the finished product, but can enable the array to generate an even more uniform field.

While the possibilities offered by net-shape manufacturing are generally known in the magnetic community, the magnetic powder particle patterning/orientation approach implemented with the system 300 differs significantly from existing technologies because it is able to be used without a binder needing to be applied to the feedstock material. The system 300 is highly advantageous in that it can be used without changing the microstructure of the feedstock powder. This approach is expected to enable the system 300 to be used in aligning fully dense anisotropic magnetic powders, to thus construct parts which compete with the highest performing sintered magnets. In this way the system 300 overcomes limitations inherent to traditional manufacturing without succumbing to the pitfalls of other AM techniques.

The present disclosure is expected to find utility in a wide, diverse range of applications including, but not limited to, 3D printing of permanent magnets, including applications in motors, generators, actuators (e.g., speakers), or sensors. Additional applications of the embodiments and methods disclosed herein are expected to include the design of magnets in shapes that are not economically feasible for traditional manufacturing approaches, particularly curved or hollow designs. Still further applications of the embodiments and methods disclosed herein are expected to involve the simultaneous deposition of structural and magnetic elements of tools, such as printing of magnets and their housing for stators (removing the need for adhesive or binder). The various embodiments and methods of the present disclosure enable the production with AM techniques of compositionally graded magnets to focus the field at specific locations, and spatially varying magnetization alignment, for example in Halbach arrays, as well as the printing of lattices for transformer cores using soft magnetic materials, and frames to provide shielding.

As noted above, the system 300 can be implemented with just the magnetic field generator subsystem 302, or it can be used in combination with the excitation source 30'. Using both the excitation source 30' and the field generator subsystem 302 enables the system 300 to pattern the granular metal powder particles, as well as to orient the particles along at least one desired axis. However, it is expected that the system 300 is likely to find significant utility using just the magnetic field generator subsystem 302.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An additive manufacturing system, comprising:
   a nozzle having a body with a tip, and configured to receive a quantity of feedstock material including granular metal powder particles, and further configured to release the granular metal powder particles out through the tip into an ambient environment, through which the deposited granular metal powder particles fall onto at least one of a build plate or a previously formed material layer, to form at least one layer of a part;
   a magnetic field generator subsystem including a processor for producing a controlled magnetic field configured to orient the granular metal powder particles on at least one of the build plate or the previously formed metal layer, after the granular metal powder particles have been released from the nozzle, and exited the tip of the nozzle and are falling through the ambient environment, in a desired orientation, before fusing of the granular metal powder particles occurs; and
   the processor controlled, magnetic field generator subsystem further being spaced at least partially elevationally below the tip of the nozzle, laterally of the tip so as to generate the controlled magnetic field in a space below the nozzle tip and outside of the nozzle body, between the nozzle tip and the build plate, to enable alignment of the granular metal powder particles along two or more axes as the granular metal powder particles are falling towards and onto the build plate, and further being arranged adjacent to the build plate to produce a magnet field encompassing the build plate.

2. The system of claim 1, wherein the magnetic field generator further operates to orient the granular metal powder particles as the granular metal powder particles are being deposited from the nozzle and falling onto at least one of a build plate or a prior formed material layer, but before reaching the at least one build plate or the prior formed material layer.

3. The system of claim 1, wherein the magnetic field generator subsystem includes a permanent magnet.

4. The system of claim 1, wherein the magnetic field generator subsystem includes an electromagnet.

5. The system of claim 1, wherein the magnetic field generator subsystem includes at least one of:
   a plurality of permanent magnets; or
   a plurality of electromagnets.

6. The system of claim 1, further comprising a position/orientation movement control system for controllably moving the magnetic field generator subsystem.

7. The system of claim 1, further comprising a granular feedstock material reservoir for containing the quantity of the granular metal feedstock material.

8. The system of claim 1, further comprising a plurality of granular feedstock material reservoirs for containing a plurality of quantities of different types of granular feedstock.

9. The system of claim 1, further comprising a setting subsystem 34 configured to perform an in-situ sintering operation to fuse the granular metal powder particles after the granular metal powder particles have been oriented in a desired manner, the in-situ sintering operation using at least one of:
   an optical signal; or
   electromagnetic energy.

10. The system of claim 1, further comprising an electronic controller for controlling a flow of the granular metal powder particles through the nozzle.

11. The system of claim 1, further comprising an electronic controller for controlling operation of the magnetic field generator subsystem.

12. An additive manufacturing system, comprising:
    a reservoir for holding a quantity of feedstock material including granular metal powder particles;

a nozzle having a body and a tip, and being in communication with the reservoir and configured to receive the quantity of granular metal powder particles and to deposit the granular metal powder particles on at least one of a build plate or a previously formed material layer, to form at least one layer of a part;

a magnetic field generator subsystem including a processor and arranged outside of the body of the nozzle independent of the nozzle, and laterally of the tip of the nozzle adjacent to the build plate, and at least partially elevationally below the tip of the nozzle, and fully laterally of a location where the granular metal powder particles are deposited, for producing a magnetic field below the tip of the nozzle and exteriorly of the body of the nozzle, between the tip of the nozzle and the build plate, and which encompasses the build plate, and configured to orient the granular metal powder particles in a desired orientation as the granular metal powder particles are falling through an ambient environment and towards and onto the build plate, on at least one of the build plate or the previously formed material layer, after the granular metal powder particles have been released from the tip of the nozzle, and before fusing of the granular metal powder particles occurs;

an electronic controller for controlling a flow of the granular metal powder particles to the nozzle; and wherein the magnetic field generator subsystem is configured to enable alignment of the granular metal powder particles along a plurality of different axes.

13. The system of claim 12, wherein the electronic controller controls operation of the magnetic field generator subsystem.

14. The system of claim 12, further comprising a position/orientation movement control system for controllably moving the magnetic field generator subsystem.

15. The system of claim 12, wherein the magnetic field generator subsystem includes a permanent magnet.

16. The system of claim 12, wherein the magnetic field generator subsystem includes an electromagnet.

17. A method for additively manufacturing a metal part, comprising:

positioning a nozzle having a body and a tip over a build plate;

using the nozzle body to receive a quantity of feedstock material including granular material, and using the tip of the nozzle to deposit the quantity of feedstock material including granular metal powder particles, on at least one of the build plate or a previously formed material present on the build plate, to form at least one layer of a part;

using a processor controlled magnetic field generator disposed adjacent to the build plate, and exteriorly and independently of the nozzle body, and at least partially elevationally below the tip of the nozzle and between the tip of the nozzle and the build plate, and laterally of the nozzle tip, to generate a magnetic field in a vicinity of the build plate below the tip of the nozzle and exteriorly of the body of the nozzle, and which encompasses the build plate, and which acts on the granular metal powder particles to orient the granular metal powder particles in a desired orientation as the granular metal powder particles are falling towards and onto the build plate through an ambient environment, before fusing the granular metal powder particles occurs; and the processor controlled, magnetic field generator subsystem further being configured to enable alignment of the granular metal powder particles along two or more axes on the build plate.

18. The method of claim 17, wherein generating a magnetic field comprises using at least one of a permanent magnet or an electromagnet to generate the magnetic field.

* * * * *